(No Model.) 3 Sheets—Sheet 1.
A. DAVIS.
CORN PLANTER.
No. 424,541. Patented Apr. 1, 1890.
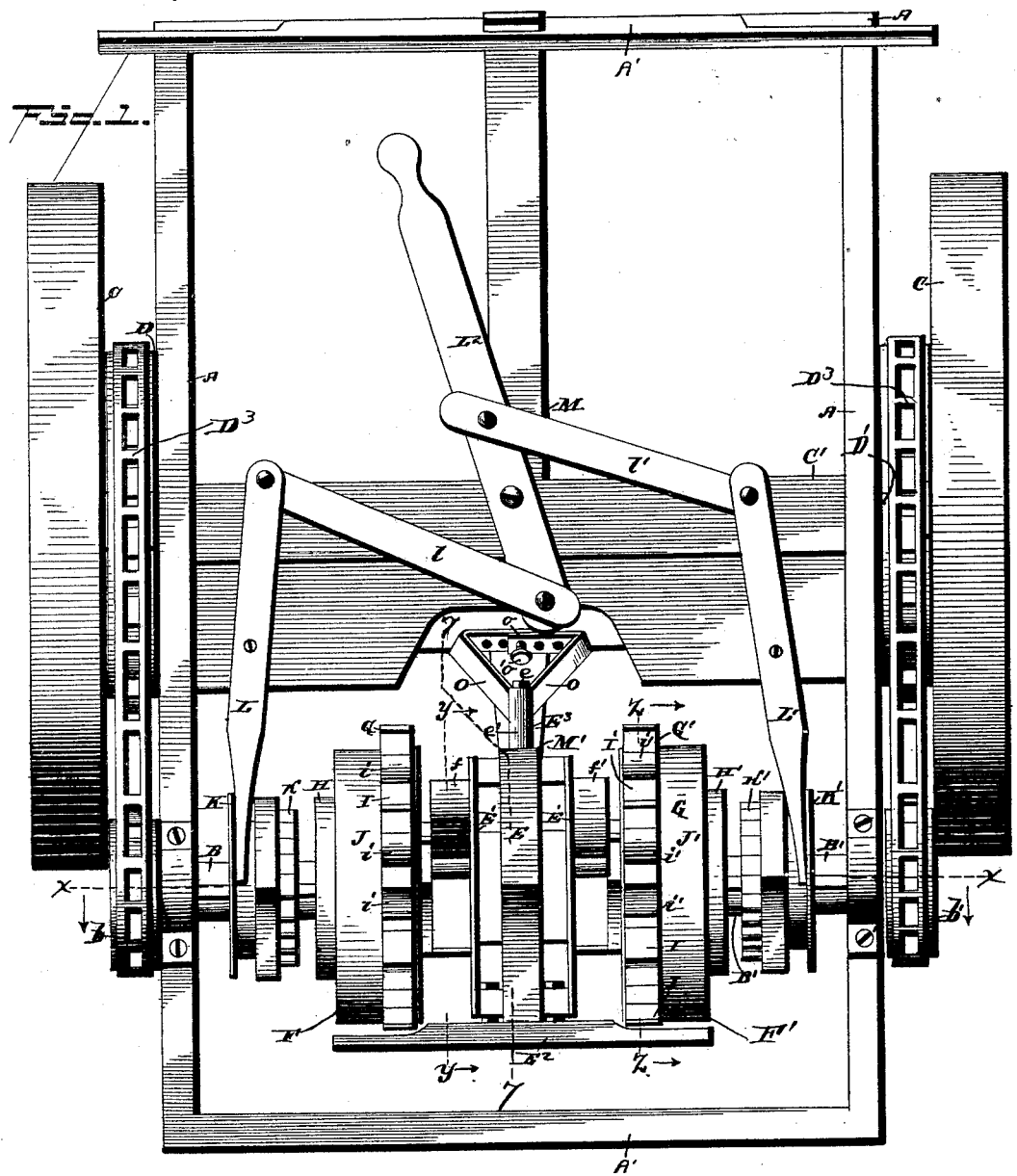
WITNESSES
W. H. Pumphrey.
Van Buren Hillyard.
INVENTOR
Albert Davis
By R.S. & A.P. Lacey
Attorneys

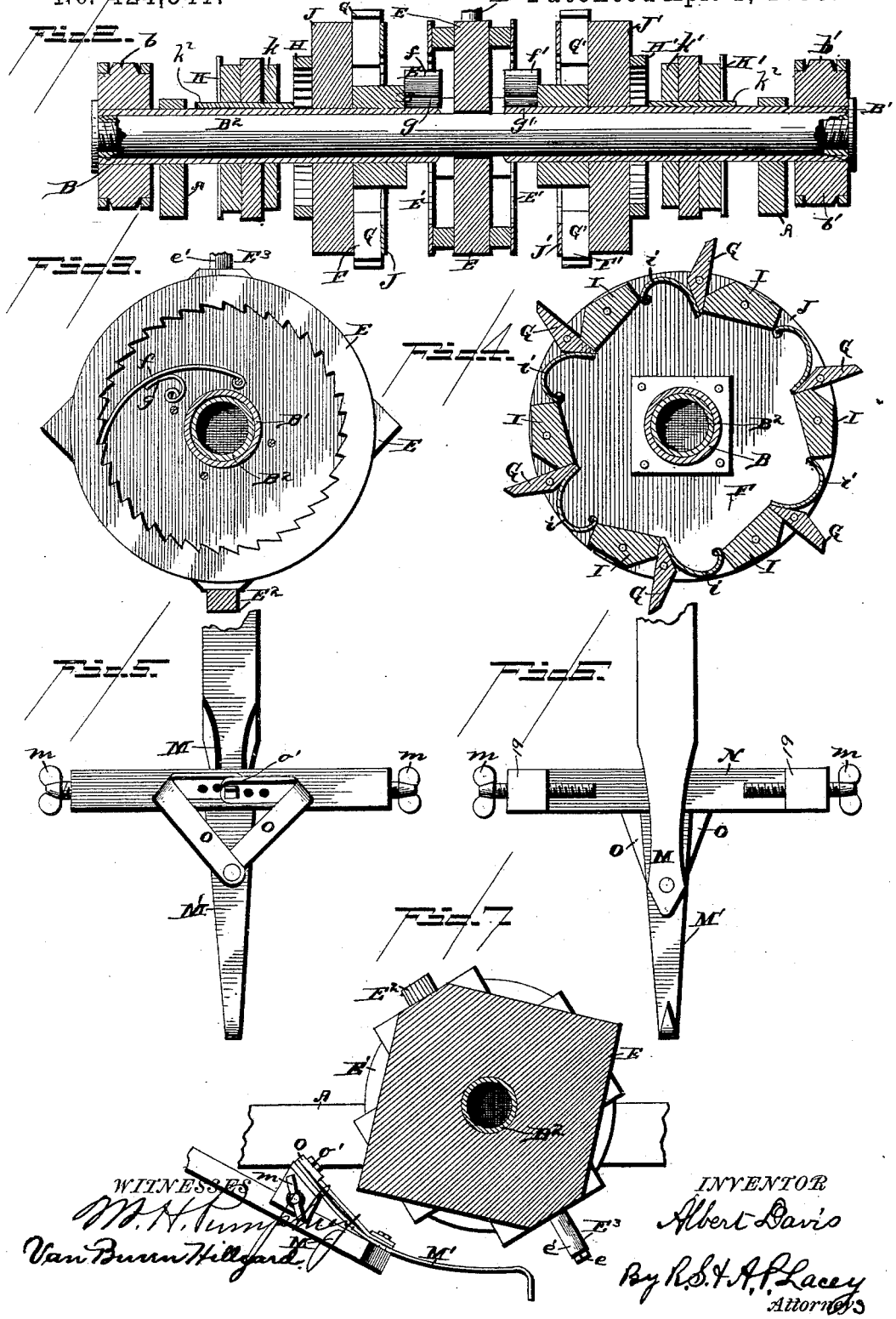

(No Model.) 3 Sheets—Sheet 3.
A. DAVIS.
CORN PLANTER.
No. 424,541. Patented Apr. 1, 1890.
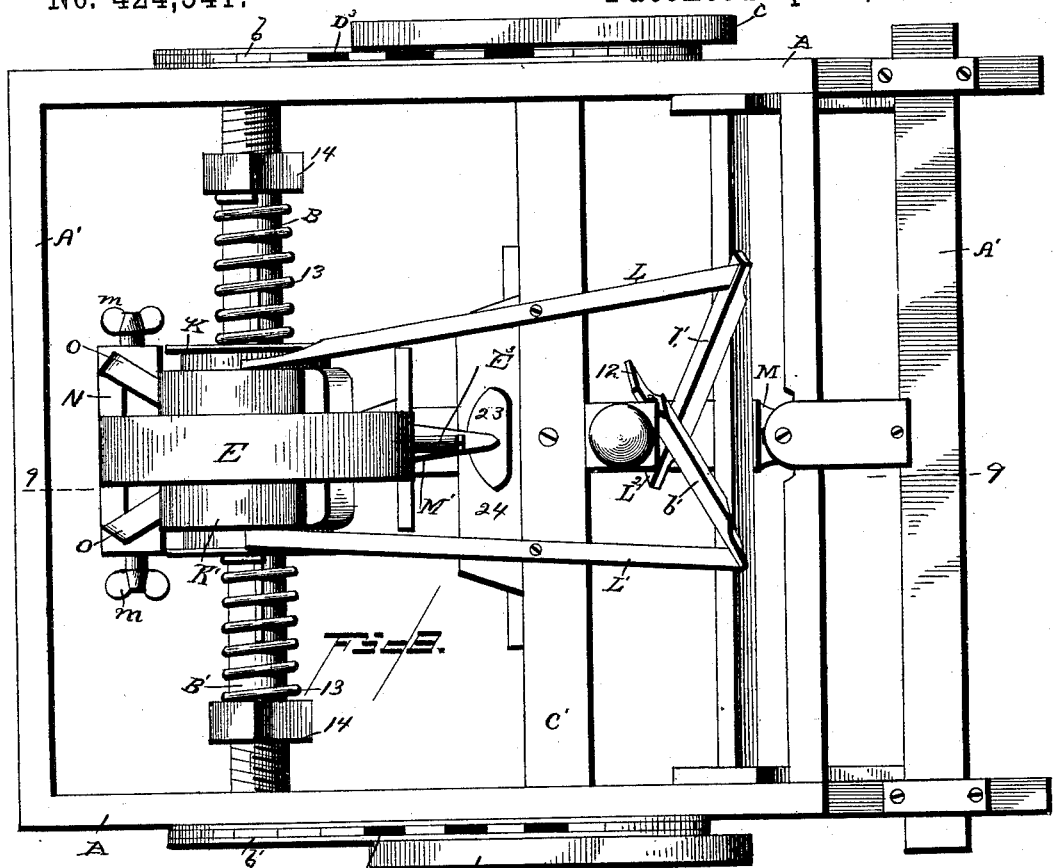
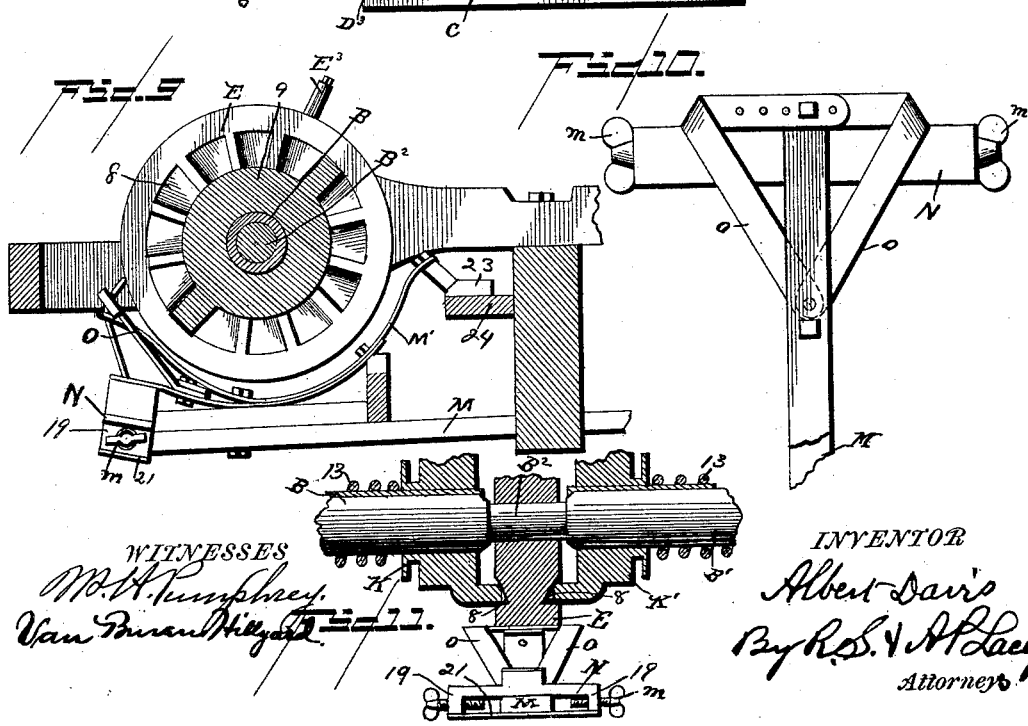
WITNESSES
INVENTOR
Albert Davis

UNITED STATES PATENT OFFICE.

ALBERT DAVIS, OF PLANKINTON, (DAKOTA TERRITORY,) SOUTH DAKOTA.

CORN-PLANTER.

SPECIFICATION forming part of Letters Patent No. 424,541, dated April 1, 1890.

Application filed July 7, 1888. Serial No. 279,241. (No model.)

*To all whom it may concern:*

Be it known that I, ALBERT DAVIS, a citizen of the United States, residing at Plankinton, in the county of Aurora and Territory of Dakota, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a planter attachment to be placed on any kind of frame to drop the corn at regular distances to make straight rows at right angles to the draft of the machine, so that the corn can be plowed both ways.

Heretofore check-row planters dispensing with the use of check-row lines, ropes, and such like devices stretched across the field do not plant the corn in straight rows without great care on the part of the driver to set the dropping mechanism forward or back, because the surface of the ground is not level and the drive-wheel does not always measure the same distance in traveling across the field because of the irregularity of its surface.

My invention aims to remedy this defect in a measure; and it consists of the peculiar construction and combination of the parts, which hereinafter will be more fully described and claimed, and shown in the annexed drawings, in which—

Figure 1 is a plan view of a planter embodying my invention; Fig. 2, a section on the line X X of Fig. 1, looking in the direction of the arrow; Fig. 3, a sectional view on the line Y Y of Fig. 1, looking to the right; Fig. 4, a sectional view on the line Z Z of Fig. 1, looking to the right; Fig. 5, a detail bottom plan view of the rear end of the slide-operating lever, showing the devices connected therewith; Fig. 6, a top plan view of the parts about on the line Y Y of Fig. 1, showing the relative arrangement of the seed-slide-operating lever and its operating-wheel; Fig. 7, a section on the line 7 7 of Fig. 1, looking to the right; Fig. 8, a plan view of a modification; Fig. 9, a detail section about on the line 9 9 of Fig. 8; Fig. 10, a detail top plan view of the rear end of the operating-lever; and Fig. 11, a detail rear end view, parts being broken away, of the modification shown in Fig. 8.

The frame composed of the side beams A and end beams A' is supported on the drive-wheels C, that are mounted on the ends of the axle C', to turn loosely thereon. The tubular shafts B and B', in axial line and journaled in the side beams of the frame, have their outer ends extended and provided with the gear-wheels $b$ and $b'$, which are connected with corresponding gear-wheels D and D', secured to the opposing sides of the drive-wheels and concentric therewith by the bands on chains $D^3$, and have their inner ends separated and supported by the shaft $B^2$, which is journaled within the shafts B and B', so that one shaft may have a movement independent of the other. The lever-operating wheel E, mounted on the shaft $B^2$, is provided with a ratchet-wheel E' on each side, integral with or otherwise secured thereto, and with a cross-bar $E^2$, that extends on each side of the plane thereof, and with a radial extension $E^3$, composed of a bolt $e$ and a sleeve or anti-friction roller $e'$, placed on the bolt.

The tappet-wheels F and F', located on each side of the lever-operating wheel E and mounted on the shafts B and B' to turn freely thereon, except under certain conditions, when they are keyed to the said shafts, are each provided, respectively, with the pawls $f$ and $f'$, the springs $g$ and $g'$ for holding the ends of the pawls in engagement with the ratchet-wheels E', the tappets G and G', that are pivoted between their ends and have their outer ends projecting beyond the periphery of the said wheels, and with crown-ratchets or half-clutches H and H' on the sides facing the drive-wheels. Each of the tappet-wheels are constructed alike and operate in precisely the same manner; hence a detailed description of the one will suffice for both. The tappets G are limited in their backward movement by the stops I, integral with or secured to the side of the wheel F, and are held against said stops by the springs $i$. The ring J, secured to the stops I, has the tappets pivotally supported between it and the wheel F. The wheel F' is provided with corresponding stops I', springs i', and a ring J'.

The clutch-sleeves K and K' are secured to the shafts B and B' between the side beams A and the tappet-wheels F and F' by a feather or spline connection K², so that they will turn with the said shafts, but be free to have a limited movement thereon to bring the half-clutches k and k' on their inner ends in and out of engagement with the half-clutches H and H' on the tappet-wheels. The shipper-levers L and L', pivoted between their ends, have their rear ends fitted in annular grooves in the clutch-sleeves and their front ends connected with the hand-lever L² by the rods l and l', which are connected with the said lever L² at points equidistant from its fulcrum. By operating the hand-lever L² the clutch-sleeves K and K' will be operated simultaneously to clutch and release the tappet-wheels, as may be desired. The said sleeve slide operating lever M is provided at its free end with the tapering finger M', which is pivotally connected therewith, and is provided at its inner end with the cross-bar N and the adjustable wings O, the wings and finger curving to approximate the curve of the wheel E. The cross-bar has its ends projected up within the plane of the lever M, and the set-screws m, passing through these ends, form adjustable stops on each side of the lever to regulate the movement of the finger M'. The wings O are pivoted at their front ends to the finger and are provided with the overlapping strips o at their free ends, which have a series of openings therein, through which the pin o' passes to adjustably connect the strips with the finger.

When the machine is drawn over the field, the tappet-wheels, being keyed to their respective shafts B and B', will be rotated in a reverse direction to the drive-wheels with which the shafts B and B' are geared, and the pawls of the tappet-wheels, engaging with the ratchet-wheels E' of the lever-operating wheels E, will carry the said wheel E around with them, and the extension E³, engaging with the finger M', will vibrate it to one side until the stop m on the cross-bar bears against the lever M, when the lever M will be moved laterally and operate the seed-slide. In the event of one wheel traveling faster than the other—as when passing over an elevation or dropping down in a depression—the tappet of the slower wheel will engage with the cross-bar E² of the wheel E and prevent it from being carried forward by the faster wheel, the tappets of the faster wheel in the meantime riding beneath the cross-bar. When the wheels are traveling at a uniform speed, they will actuate the wheel E together.

The modification shown in Fig. 8 and in the detail views Figs. 9, 10, and 11 is much simpler than the construction heretofore described, in that it dispenses with the tappet-wheels F and F', the other parts being substantially the same as that shown in Fig. 1. The operating-wheel E is mounted on the shaft B², and is provided with ratchet-teeth 8 in each side, which are adapted to be engaged by the clutches K and K', mounted on the tubular shafts. The clutches are held in engagement with the operating-wheel E by the springs 13, which are mounted on the tubular shafts B B' and confined between the said clutches and the adjustable nuts 14, the nuts being adjustable to vary the tension of the said springs. The cross-bar N has depending lugs 19 at its ends to receive the adjusting-screws m, and to which the spring 21 is secured at its ends. This spring exerts a pressure on the lever M, and prevents it rebounding or moving too quickly when the finger M' is operated on. The front end of the operating-finger M' curves upwardly in front of the operating-wheel, and is provided with the shoe 23, which travels on the ledge 24 and supports the said end of the finger.

Having thus described my invention, what I claim, and desire to secure by Letters Patent, is—

1. In a planter, the combination, with the lever-operating wheel E and the seed-slide-operating lever M, of the finger M', curving in length and tapering at its front end, pivotally connected with the said lever M, the cross-bar N, secured to the said finger and having extensions 19 at its ends, and the set-screws m, passing through the said extensions 19 and adapted to engage with and limit the movements of the said lever M, substantially as and for the purpose specified.

2. In a planter, the combination, with the lever-operating wheel and the seed-slide-operating lever, of the finger and the laterally-adjustable wings, substantially as and for the purpose described.

3. In a planter, the combination, with the lever-operating wheel and the seed-slide-operating lever, of the finger, the adjustable wings, the cross-head, and the adjustable stops at the ends of the cross-head, substantially as described.

4. In a planter, the combination, with the lever-operating wheel and the seed-slide-operating lever, of the finger pivotally connected with the said lever, the cross-bar having stops, and the flat spring 21, connected with the cross-bar and bearing on the said operating-lever, substantially as described.

5. In a planter, the combination, with the lever-operating wheel having a ratchet-wheel on each side and having a cross-bar, of the two tappet-wheels having the lever-operating wheel between them and provided with pawls to engage with the said ratchet-wheels, and with tappets which project within the path of the cross-bar, substantially as and for the purpose described.

6. In a planter, the combination, with the lever-operating wheel having a cross-bar which forms lateral extensions, of the tappet-wheels having the lever-operating wheel between them and provided with tappets that extend within the path of the said lateral extensions, substantially as and for the purpose described.

7. In a planter, the combination, with the lever-operating wheel, of the tappet-wheel, the tappets pivotally supported, the stops for limiting the movement of the tappets, and the springs for holding the tappets in an operative position, substantially as specified.

8. The combination, in a corn-planter, of the lever-operating wheel having a cross-bar which forms lateral extensions, two tappet-wheels having the lever-operating wheel between them and adapted to engage with the said lever-operating wheel in their forward movement, the tappets pivoted to the tappet-wheels, the stops for limiting the movement of the tappets, the springs for holding the tappets in an operative position, and the rings secured to the stops and forming a support for the outer ends of the pivots of the tappets.

9. The combination, with the two shafts B and B′ in axial line, and the independent shaft $B^2$, connecting and forming a support for the inner ends of the shafts B and B′, of the lever-operating wheel mounted on the shaft $B^2$ and having a cross-bar, and the tappet-wheels mounted on the shafts B and B′ and engaging with the lever-operating wheel and provided with tappets which extend within the path of the said cross-bar, substantially as and for the purpose described.

10. In a planter, the combination of the two shafts B and B′, driven from the drive-wheels independently of each other, the shaft $B^2$, forming a support for the inner ends of the shafts B and B′, the lever-operating wheel mounted on the shaft $B^2$ and having a cross-bar, the tappet-wheels mounted on the shafts B and B′, respectively, and free to turn thereon and adapted to engage with the lever-operating wheel, the tappets supported by the tappet-wheels and projecting within the path of the said cross-bar, the clutch-sleeve keyed on the shafts B and B′ to turn therewith and free to move thereon in and out of engagement with the tappet-wheels, and means for operating the said clutch-sleeves, substantially as and for the purpose described.

11. The herein-described planter composed of the frame, the drive-wheels loosely mounted on the axle and having gear-wheels secured to their sides, the two tubular shafts having gear-wheels on their outer ends which are in mesh with the gear-wheels on the drive-wheels, the shaft $B^2$, journaled within the tubular shafts, the lever-operating wheel E, mounted on the shaft $B^2$ and having ratchet-wheels on each side thereof, the cross-bar projecting laterally from the said wheel E, the radial extension, the tappet-wheels mounted loosely on the tubular shafts and having pawls which engage with the ratchet-wheels on the wheel E, and having tappets which project within the path of the said cross-bar, the clutch-sleeves adapted to key the tappet-wheels to the tubular shafts, means for operating the clutch-sleeves, the seed-slide-operating lever, the finger pivoted to the said lever, the cross-bar supported by the finger and having adjustable stops at its ends, and the adjustable wings, substantially as specified.

In testimony whereof I affix my signature in presence of two witnesses.

ALBERT DAVIS.

Witnesses:
S. H. BAKEWELL,
E. H. MAYHEW.